(12) United States Patent
Onuma (10) Patent No.: US 6,493,105 B1
(45) Date of Patent: Dec. 10, 2002

(54) E-MAIL CONVERTING APPARATUS, INTERNET FACSIMILE APPARATUS, AND E-MAIL TRANSMISSION METHOD

(75) Inventor: Asahiro Onuma, Tokyo (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/282,192

(22) Filed: Mar. 31, 1999

(30) Foreign Application Priority Data

Jul. 10, 1998 (JP) .......................................... 10-195667

(51) Int. Cl.⁷ .............................. H04N 1/00; G06F 15/00
(52) U.S. Cl. ...................................... 358/1.15; 358/402
(58) Field of Search ................................ 358/1.15, 402, 358/404, 451, 407; 379/100.08, 100.09

(56) References Cited

U.S. PATENT DOCUMENTS

| | | | |
|---|---|---|---|
| 5,675,507 A | 10/1997 | Bobo, II | 358/400 |
| 5,812,278 A | 9/1998 | Toyoda et al. | |
| 5,881,233 A | 3/1999 | Toyoda et al. | 358/402 |
| 6,101,548 A * | 8/2000 | Okada | 709/236 |
| 6,219,150 B1 * | 4/2001 | Eguchi | 358/1.15 |
| 2001/0015823 A1 * | 8/2001 | Sato | 358/1.15 |
| 2002/0012424 A1 * | 1/2002 | Nishio et al. | 379/100.08 |
| 2002/0032739 A1 * | 3/2002 | Iida | 709/206 |

FOREIGN PATENT DOCUMENTS

| | | |
|---|---|---|
| EP | 835021 | 4/1998 |
| EP | 0880266 | 11/1998 |
| EP | 880268 | 11/1998 |
| EP | 0880268 | 11/1998 |
| JP | 2-312441 | 12/1990 |
| JP | 8-125687 | 5/1996 |
| JP | 9-116728 | 5/1997 |
| JP | 9-247335 | 9/1997 |
| JP | 10322501 | 12/1998 |
| JP | 10322506 | 12/1998 |
| JP | 11-32196 | 2/1999 |
| JP | 11-68825 | 3/1999 |
| WO | 97/10668 | 3/1997 |

* cited by examiner

Primary Examiner—Kimberly A. Williams
(74) Attorney, Agent, or Firm—Greenblum & Bernstein, P.L.C.

(57) ABSTRACT

The Internet facsimile apparatus is provided with a format converting section which converts image data to e-mail, and a mail transmission section which transmits the e-mail via a network. The format converting section converts the received facsimile data to an e-mail page by page. A destination address management section issues a management number for each piece of facsimile data, and at the same time issues a page number for each of page. The management number and page number are registered in a management table. The format converting section provides the management number and page number to the subject of an e-mail. Thereby, since the data capacity of the e-mail is reduced when transmitting and receiving the facsimile data via a network, it is possible to prevent receiving errors from occurring and to improve the transmission quality. Simultaneously, the e-mail is managed or supervised by the management number and page number.

15 Claims, 12 Drawing Sheets

| MANAGEMENT NUMBER | PAGE NUMBER | DESTINATION E-MAIL ADDRESS |
|---|---|---|
| #1 | 1 | todd@abc.com |
| #1 | 2 | Todd@abc.com |
| #2 | 1 | USER01@xxx,yyy.co.jp |
| ⋮ | | |
| #9xx | 5 | USER02@xxx,yyy.co.jp |

MANAGEMENT TABLE

E-MAIL CONVERTING APPARATUS, INTERNET FACSIMILE APPARATUS, AND E-MAIL TRANSMISSION METHOD

BACKGROUND OF THE INVENTION

1. Field of the Invention

The present invention relates to an e-mail converting apparatus which converts image data outputted by, for example, a facsimile apparatus or scanned by a scanner to electronic mail (hereinafter called "e-mail"), and receives and transmits the same via the internet.

The present invention also relates to an internet facsimile apparatus in which the corresponding e-mail converting apparatus is incorporated, and the invention further relates to an e-mail transmission method.

2. Description of the Related Art

A facsimile apparatus has been developed, which transmits image data via the Internet by operations similar to those of general facsimile apparatuses. Since the Internet is used for the entirety or a part of a transmission channel, this type of facsimile is called an Internet facsimile (hereinafter called IFAX) or an e-mail type facsimile apparatus.

The IFAX is equipped with an e-mail converting apparatus which mutually converts a format of facsimile data to that of e-mail data or vice versa and performs receiving and transmission thereof. Therefore, the IFAX operates as described below. The transmission side converts the format of facsimile data to that of the e-mail and transmits the data. The receiving side converts the format of received e-mail to that of image data and prints out the data like facsimile data received by a typical facsimile apparatus.

However, if the transmission side converts facsimile data exceeding the capacity of a receiving memory of the receiving side and transmits the data, the receiving side produces a receiving error. Since the IFAX ordinarily can not perform any negotiation with the transmission side, the transmission side can not predict this receiving error.

Furthermore, in transmission over LAN and the Internet, data is divided packet by packet, and these packets are transmitted to complete the entire transmission. The original data is restored by reassembling these packets. Therefore, the more the volume of the transmitted data is increased, the higher the possibility of losing a part of the packets becomes. Therefore, incorrect data is lost may be formed, in which a part of the data. As a result, a higher quality in transmission can not be obtained.

Furthermore, sheets of recording paper vary in standard by country. For example, in European or North American countries, letter size sheets of recording papers are generally used while in Japan A4 and B5 size sheets of recording paper are usually used, and there are cases where a larger size of sheets such as B4 size sheets of recording paper are used. Therefore, there are differences in the performance of facsimile apparatuses by country. For example, generally, a facsimile apparatus used in Japan has a greater memory than in European countries. Since it is considered that the IFAX is used for international transmissions, it is desired that such differences between countries or regions are resolved.

SUMMARY OF THE INVENTION

It is therefore the first object of the invention to provide an e-mail converting apparatus which prevents receiving errors from occurring, improves the transmission quality, and is able to handle international transmissions.

It is the second object of the invention to provide an e-mail converting apparatus which prevents receiving errors from occurring, improves the transmission quality, and is able to handle international transmissions.

It is the third object of the invention to provide an e-mail transmission method which prevents receiving errors from occurring, improves the transmission quality, and is able to handle international transmissions.

In order to achieve the above-mentioned objects, by an apparatus for converting image data to an e-mail, comprising: a format converting section for converting a plurality of image data to an e-mail per each divisional unit; and an e-mail transmitting section for transmitting said e-mail via a network.

In order to achieve the above-mentioned objects, by a method of converting image data to an e-mail, comprising the steps of: converting each divisional unit of a plurality of image data to an e-mail; and transmitting said e-mail via a network.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Hereinafter, a detailed description is given of the preferred embodiments of the invention with reference to the accompanying drawings.

First Preferred Embodiment

Figure 1:
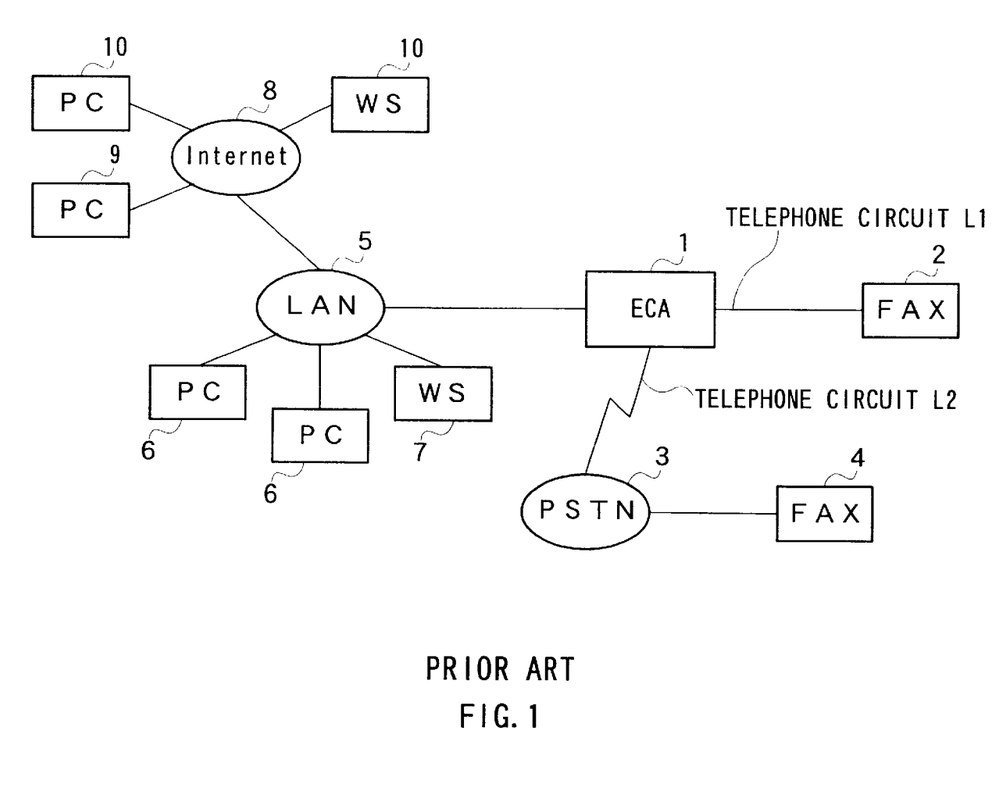
FIG.1 is a system concept view showing a peripheral configuration in which an e-mail converting apparatus according to a first preferred embodiment of the invention operates.

FIG.1 is a system concept view showing the peripheral configuration in which an e-mail converting apparatus according to a first preferred embodiment of the invention operates.

The e-mail converting apparatus (ECA) 1 according to the above-mentioned first preferred embodiment is connected to a transmission side facsimile apparatus 2 via a telephone circuit L1. Simultaneously, the e-mail converting apparatus 1 is connected to the public switched telephone network (PSTN) 3 via a telephone line L2. A receiving side facsimile apparatus 4 is connected to the public switched telephone network 3.

Furthermore, the e-mail converting apparatus 1 is connected to a LAN (local area network) 5. Personal computers (hereinafter called PCs) 6 and Workstations (hereinafter called WSs) 7 are connected to LAN 5. The LAN 5 is further connected to the Internet 8. PCs 9 and WS 10 are connected to the Internet 8.

Figure 2:
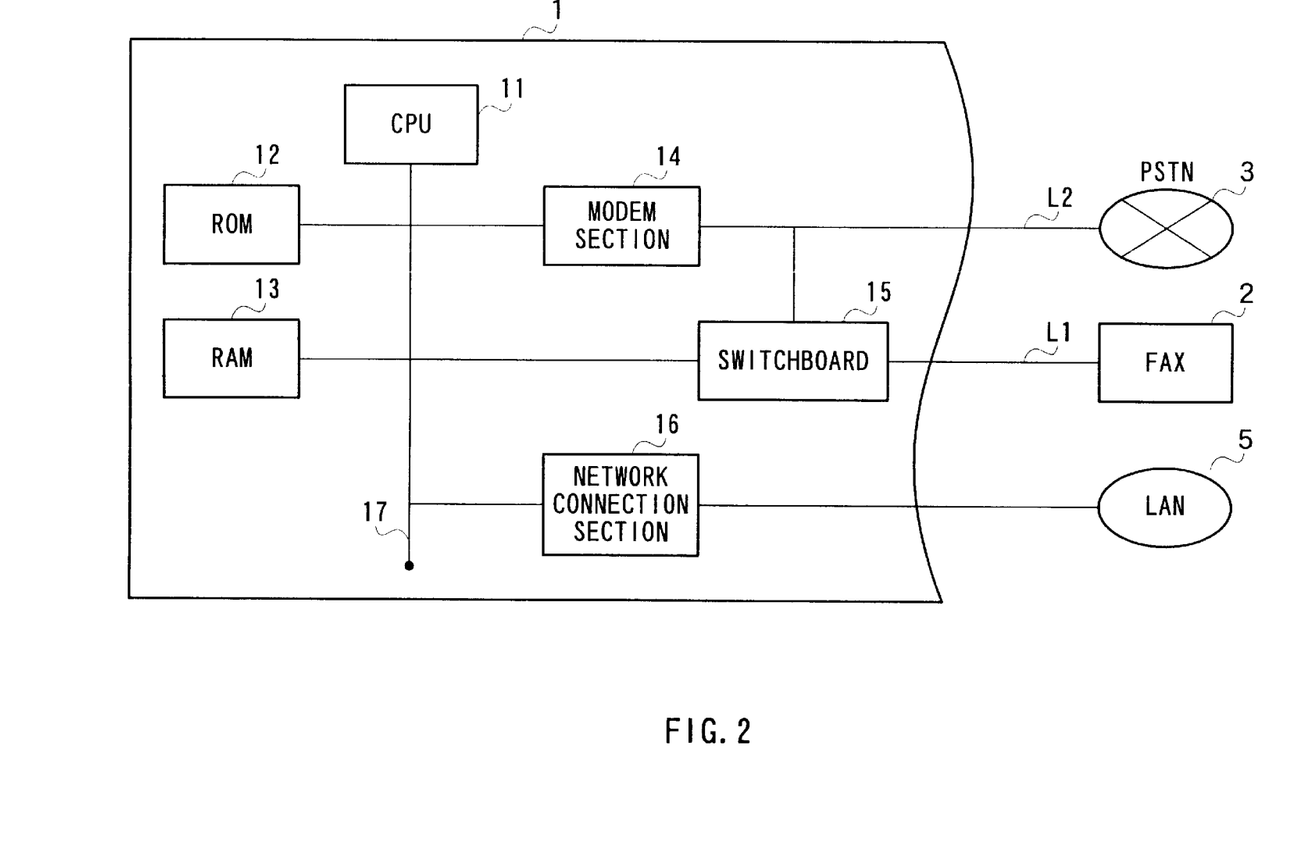
FIG.2 is a block diagram showing a hardware configuration of the e-mail converting apparatus according to the above-mentioned first preferred embodiment.

FIG.2 is a block diagram showing a hardware configuration of the e-mail converting apparatus 1 according to the above-mentioned first preferred embodiment.

The central processing unit (CPU) 11 executes various kinds of programs and controls the respective parts of the e-mail converting apparatus 1. ROM 12 stores programs executed by the CPU 11. RAM 13 is used as a work area of the programs, and, at the same time, is used as a receiving memory which stores the received facsimile data.

Modem section 14 carries out modulation and demodulation for communications of image data with a peripheral facsimile apparatus via telephone circuits L1 and L2 in compliance with the facsimile transmission protocol. Switchboard 15 carries out a changeover between the telephone circuits L1 and L2. Network connection section 16 is an interface to control transmission and receiving of data with respect to the LAN 5. The network connection section 16 is for example a LAN interface. Bus 17 is a channel for transferring data among the CPU 11, ROM 12, RAM 13, modem section 14 and network connection section 16.

Figure 3:
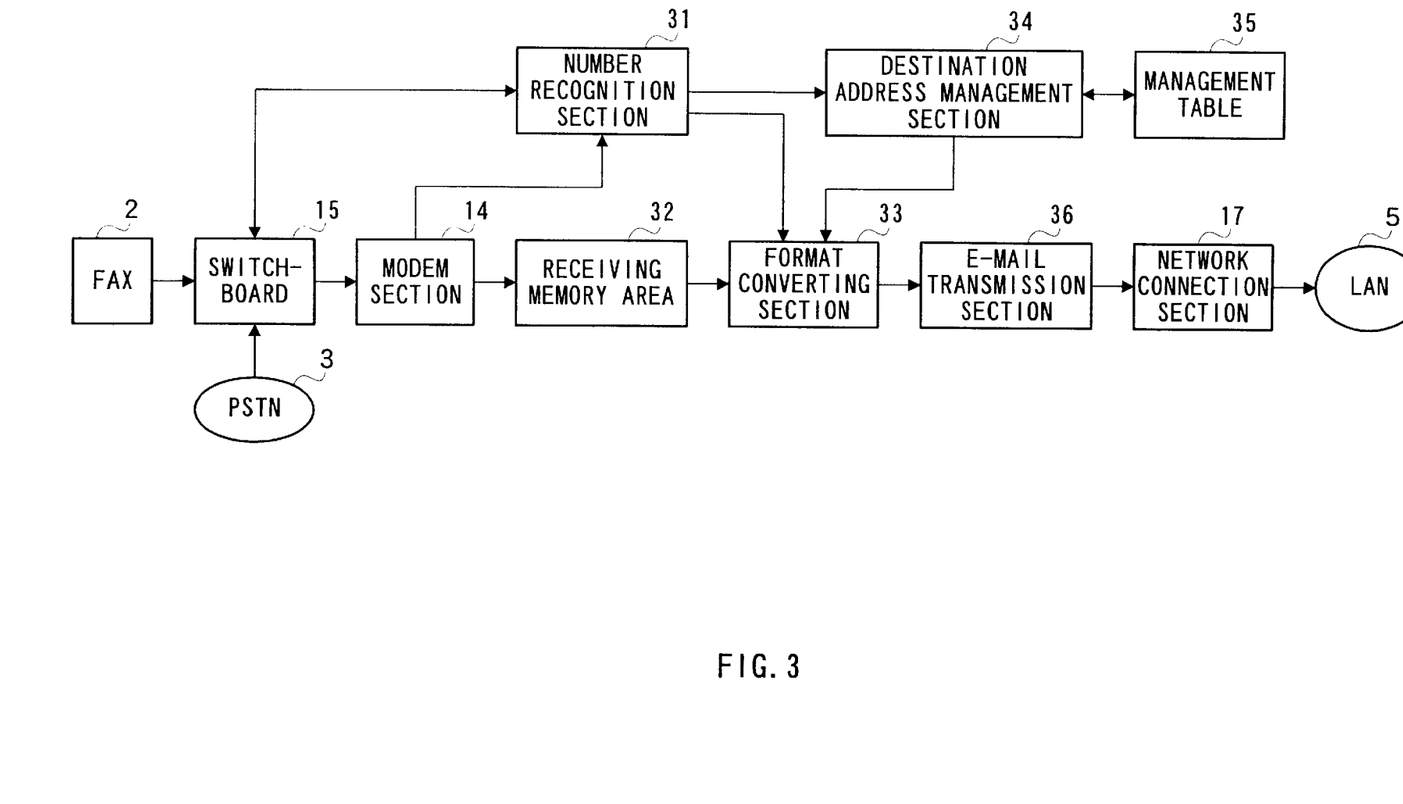
FIG.3 is a functional block diagram of the e-mail converting apparatus according to the above-mentioned first preferred embodiment.

FIG.3 is a function block diagram of the e-mail converting apparatus 1 according to the above-mentioned first preferred embodiment.

Number recognition section 31 recognizes a telephone number (facsimile number) received from the telephone circuit L1, and on the basis of the recognized telephone number, decides whether the facsimile data continued to the telephone number is taken in or is passed to the telephone circuit L2. The decision is carried out with reference to a comparison table of telephone numbers and destination e-mail addresses which are stored in the RAM 31. In detail, the decision is made on the basis of whether or not the received telephone number exists in the comparison table.

Furthermore, the number recognition section 31 switches the switchboard 15 on the basis of a result of decision.

Receiving memory area 32 is a part of an area of the RAM 13 shown in FIG.2, where facsimile data are stored when it is decided that the facsimile data is taken in. Herein, the facsimile data refer to image data compressed by an image compressing used for usual facsimile transmission such as MH, MR and MMR.

Format conversion section 33 converts the facsimile data to e-mail. In detail, the format conversion section 33, first, converts the facsimile data to a TIFF (Tagged Image File Format) file. Next, the obtained TIFF file is attached to the e-mail in compliance with MIME (Multipurpose Internet Mail Extensions). In detail, the format conversion section 33 converts the TIFF file to ASCII codes in compliance with an encoding format such as Base 64, and next, inserts the coded data in an image part of the e-mail.

Furthermore, the format conversion section 33 replaces the telephone number recognized by the number recognition section 31 to a destination address and describes it in the destination address field (To:) of the header section. Moreover, the format conversion section 33 describes various types of header information such as a transmission side mail address (From:), a message title (Subject:), etc., in the header section.

The facsimile data received at the modem section 14 contain a plurality of image data obtained by scanning a plurality of pages of an original document at the facsimile apparatus 2. The format conversion section 33 sequentially takes in each small portion that contains at least one of the plurality of image data from a group comprising a plurality of image data according to a predetermined standard (hereinafter referred to as divisional unit) from the receiving memory area 32. In this example, the format conversion section 33 takes in each image data corresponding to a page of the original document from a plurality of image data. Therefore, divisional unit is one page of the original document in this case. Then, the format conversion section 33 converts the image data contained in the small portion to the TIFF file, and converts the TIFF file to an ASCII code to provide to an image part of an electronic mail. The conversion section 33 thus divides a group comprising a plurality of image data per a divisional unit, and converts image data contained in the divided group to an electronic mail.

Figure 4:
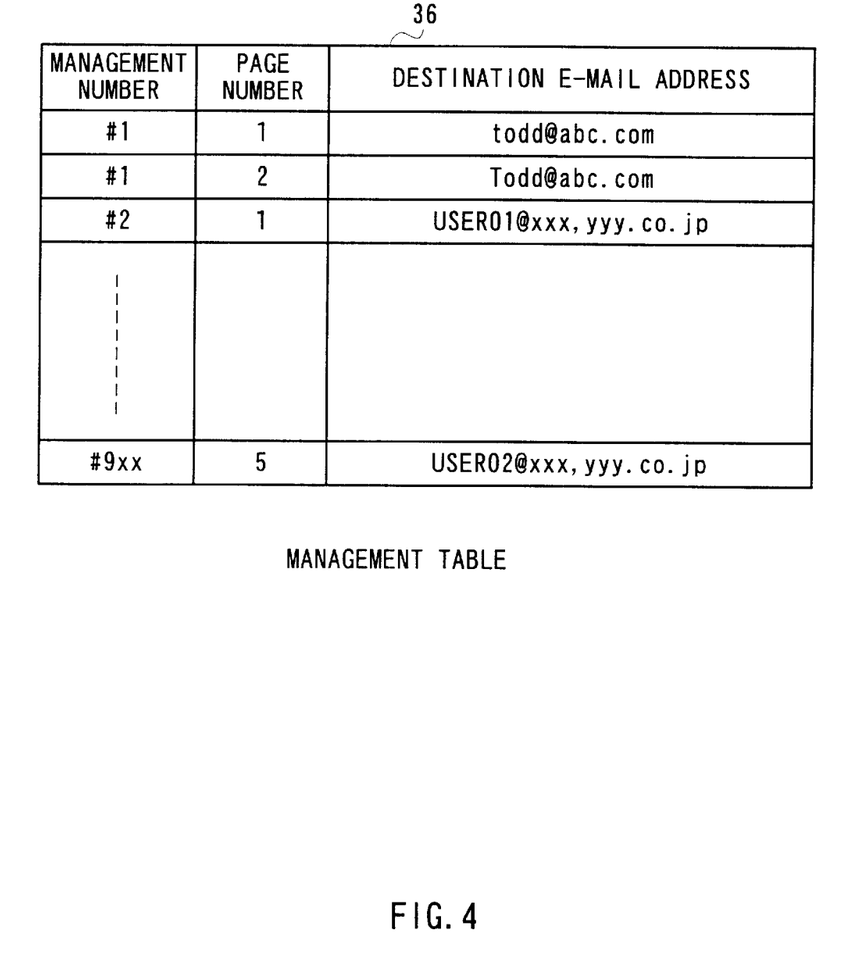
FIG.4 is a exemplary view showing an example of a management table of the e-mail converting apparatus according to the above-mentioned first preferred embodiment.

Destination address management section 34 manages the original document, their divisional units and their destination addresses to register in a management table 35 in relation to each other. In this example, the divisional unit is page by page with respect to the original document. FIG.4 is an exemplary view showing one example of the management table. As shown in FIG.4, management numbers such as, for example #1, #2, . . . #9, page number and destination e-mail address are recorded in the management table 35 in relation to each other for each of the e-mail.

Thus, the destination address management section 34 issues the management number for each of the original documents, in other words, for each piece of facsimile data, and also issues the page number for each page unit of the original document, that is, per divisional unit of facsimile data. Furthermore, the destination address management section 34 gives the management number and the page number to the subject field (Subject:) of the header section of the e-mail with reference to the management table 35.

Mail transmission section 36 sends out an e-mail generated by the format conversion section 33 to the LAN 5 via a network connection section 17 in compliance with an e-mail transfer protocol such as SMTP (Simple Mail Transfer Protocol).

Figure 5:
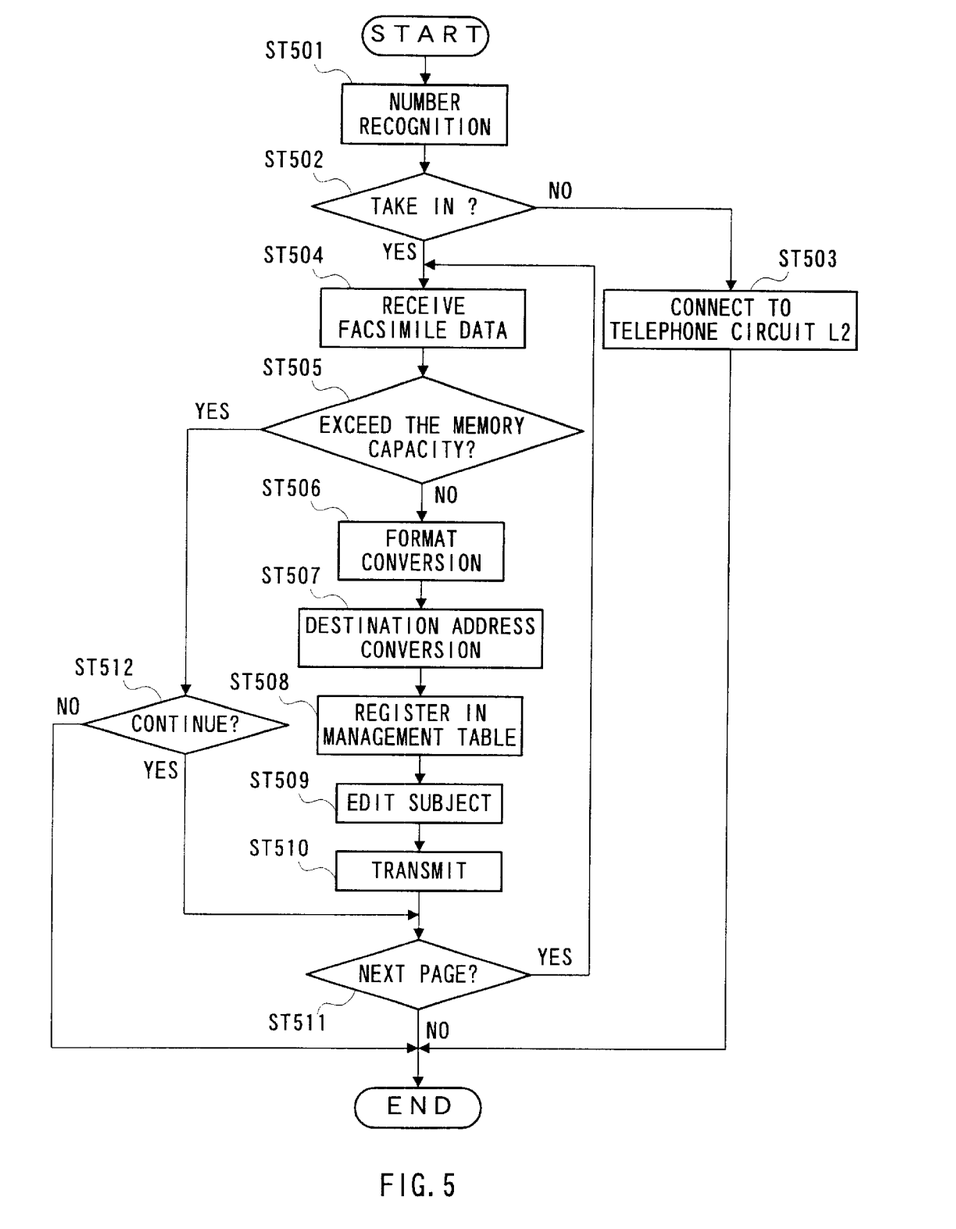
FIG.5 is a flow chart showing the respective steps of a conversion process by the e-mail converting apparatus according to the above-mentioned first preferred embodiment.

Hereinafter, a description is given of the process of converting facsimile data, to an e-mail made by the e-mail converting apparatus 1 constructed as described above. FIG. 5 is a flow chart showing the respective steps of a converting process made by the e-mail converting apparatus 1 according to the above-mentioned first preferred embodiment.

In step (hereinafter called ST) 501, the number recognition section 31 recognizes the received telephone number.

Next, in ST 502, it is judged whether or not the facsimile data are taken in on the basis of the recognized telephone number. In a case where the facsimile data are not taken in, the process advances to ST 503 and the telephone circuit L1 is connected to the telephone circuit L2 by the switchboard 15, wherein the process is terminated.

On the other hand, in a case where the facsimile data are taken in, in ST 504, facsimile data equivalent to a page is received.

Figure 6:
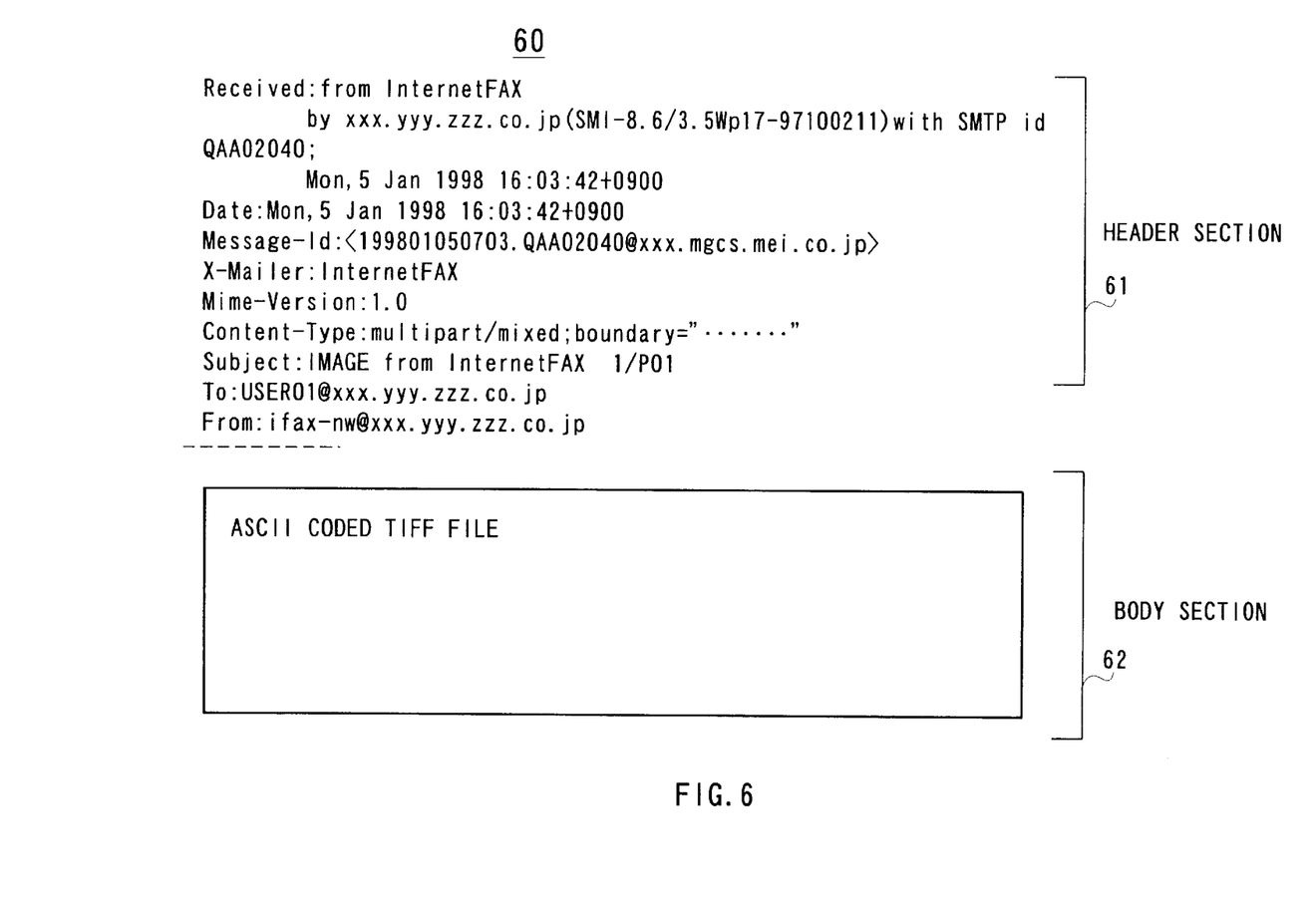
FIG.6 is a view showing an example of an e-mail converted by the e-mail converting apparatus according to the above-mentioned first preferred embodiment.

In ST 505, it is judged whether or not the received facsimile data exceed the memory capacity of a receiving memory area 32. In a case of not exceeding the memory capacity, the received facsimile data are converted to an e-mail by the e-mail conversion section 33 in ST 506. FIG. 6 is a view showing one example of the converted e-mail. E-mail 60 is composed of a header section 61 and a body section 62. The header section 61 contains respective fields such as a subject (Subject:), a destination address (To:), a transmission side address (From:), etc., while the body section 62 contains an ASCII coded TIFF file.

Next, in ST 507, the number recognition section 31 replaces the telephone number to a destination address.

In ST 508, the destination address management section 34 registers a management number, page number, and destination address in the management table 35.

In ST 509, the format conversion section 33 gives the management number and page number to the subject field (Subject:) of the header section. In ST 510, the mail transmission section 36 transmits an e-mail thus prepared.

In ST 511, it is judged whether or not there is any next page. If there is a next page, the process returns to ST 504, and if not, the process is terminated. It is judged on the basis of MPS (Multipage Signal) defined in ITU T30 whether or not there is any next page. However, the decision of a next page is not limited to the above-mentioned method, wherein various methods are considered, for example, if a page to be sent next is sent, it is then judged that there is a next page.

On the other hand, in ST 505, in a case where the received facsimile data exceeds the memory capacity of the receiving memory area 32, in ST 512, reference is made to the user with respect to whether or not the process is continued. When the user selects continuation, the process is caused to advance to ST 511. If the user does not select continuation, the process is terminated.

Figure 7:
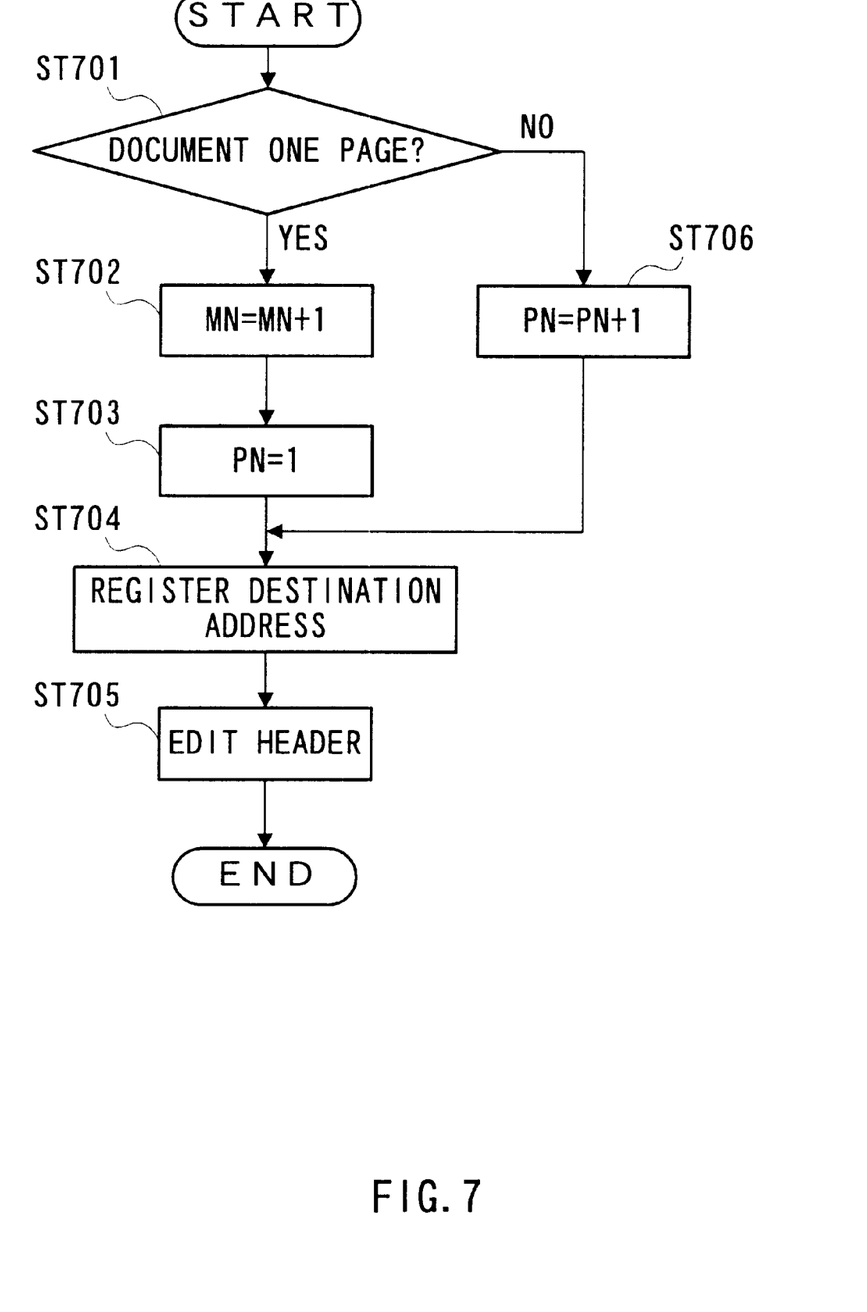
FIG.7 is a flow chart showing the respective steps of destination address management and header edition process by the e-mail converting apparatus according to the above-mentioned preferred embodiment.

Next, a detailed description is given of the destination address management and header edition. FIG. 7 is a flow chart showing the respective steps of the destination address and header edition process carried out by the e-mail converting apparatus 1 according to the above-mentioned first preferred embodiment.

First, a default of the management table 35 is set at the management number (MN)#0. In ST 701, it is judged whether or not the facsimile data to correspond to the first page of the original document. Herein, in a case where the data correspond to the first page, in ST 702, the management number is incremented by one, and in ST 703, the page number (PN) is set to "1".

In ST 704, the destination address is registered in the management table 35, thereby, information registration of the e-mail of the first page of the original document is completed. Next, in ST 705, the format conversion section 33 edits the header section and gives the management number and page number to the subject. In this example, as shown in FIG. 7, the format is in a form of Subject+ "management number" /P "page number" such as "IMAGE from Internet FAX /P01".

In ST 701, in a case where it is judged that the original document is the second page or thereafter, the page number is incremented by one in ST 706, and the process advances to ST 704, wherein information registration of the e-mail on the second page or thereafter of the document is completed. Next, in ST 705, the header section is edited, and the management number and page number are given to the subject section. For example, in a case where the facsimile data is for the second page, the subject of the e-mail becomes "IMAGE from Internet FAX 1/P02".

Figure 8:
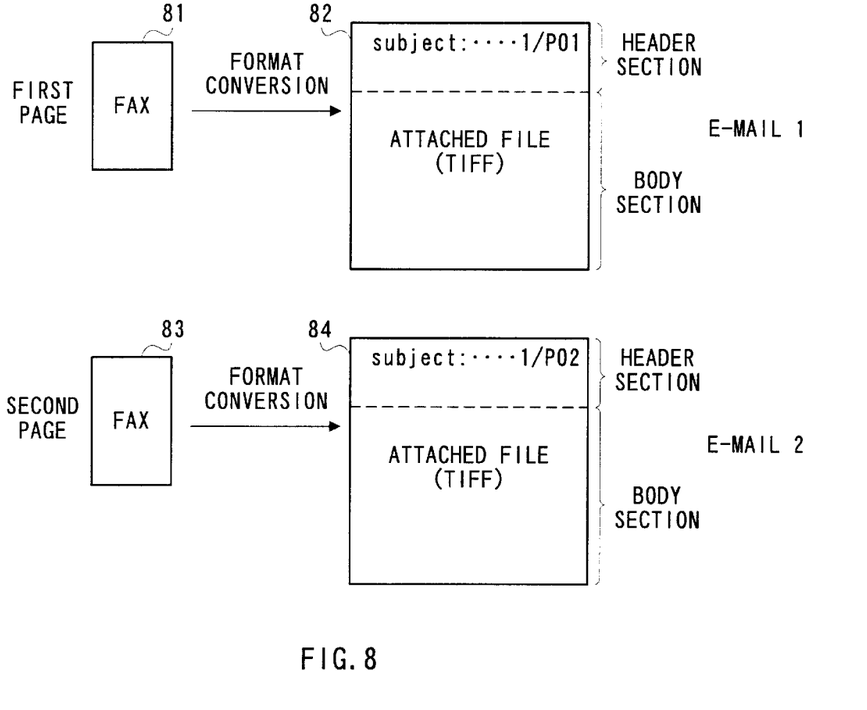
FIG.8 is a concept view showing a format conversion process in the e-mail converting apparatus according to the above-mentioned first preferred embodiment.

As a result, as shown in FIG. 8, the first e-mail 82 corresponding to the first page document 81 and the second e-mail 84 corresponding to the second page document 83 are generated.

Figure 9:
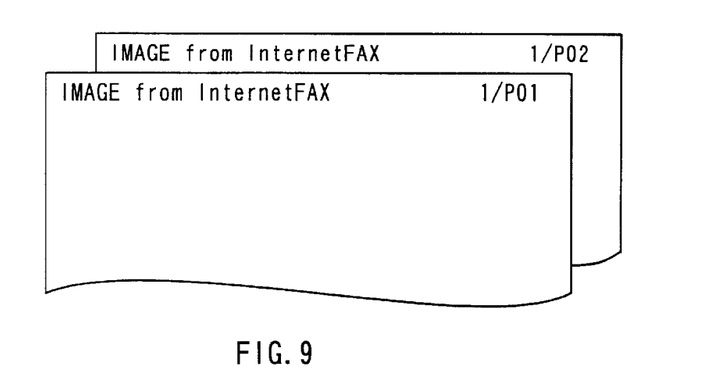
FIG.9 is a view showing a state where the subject of an e-mail is overwritten on image data in the e-mail converting apparatus according to the above-mentioned first preferred embodiment.

As shown in FIG. 9, the subject of the e-mail to which a message indicative of a transmission from an internet facsimile, a management number and a page number are given can be overwritten on the image data.

The e-mail converting apparatus 1 converts image data to an electronic mail to transmit. A receiving apparatus that receives the electronic mail prints the image data on recording paper.

It is easy to recognize a sender address when data indicative of the sender address are provided at an upper part of the recording paper. Because of it, it is preferable for the e-mail converting apparatus 1 to superimpose management data including at least sender information and the page number at the upper part of image data contained in the TIFF file.

The management data include information acquired from the transmission side facsimile apparatus according to a facsimile communication protocol such as information concerning a sender (hereinafter referred to as sender information), for example, terminal ID and transmission time, information acquired from the management table 35 such as destination mail address, and information generated every time in a format conversion (generation of TIFF page file) such as the page number.

The e-mail converting apparatus 1 converts all of management data acquired and generated by a plurality of method types as described above to image data to combine with original image data in a memory.

According to the above processing, in the case of transmitting and receiving image data using an e-mail protocol, management data are printed on each page of recording paper printed at a receiving side apparatus. It is thus possible for a recipient to know the content of the management table by glancing a print.

According to the e-mail converting apparatus 1 constructed as described above, since the facsimile data transmitted by facsimile apparatus 2 is divided page by page and is converted to e-mail, the volume of the data per e-mail can be decreased. Thereby, the probability of lost packets can be lowered by a lowering of the transmission data volume. If a certain packet should be lost, the loss can be suppressed to only one page. Thus, it is possible to remarkably improve the transmission quality.

Furthermore, the e-mail converting apparatus 1 divides facsimile data page by page. That is, as shown in FIG. 5, facsimile data equivalent to one page of a document consisting of a plurality of pages is taken in the receiving memory area 32 and is format-converted to an e-mail for transmission. Intake, conversion and transmission are repeated until no page remains. Thereby, since the receiving memory area 32 is sufficient if it has capacity equivalent to one page, the capacity may be decreased. Simultaneously, the receiving memory area of the receiving side facsimile apparatus can be decreased. Thus, the production cost of the facsimile apparatus can be decreased.

Furthermore, since a management table 35 in which management numbers and page numbers are related to each other is formed, and the management numbers and page numbers are given to pieces of e-mail in pairs, it is possible to know that the e-mail received at the receiving side belongs to the same document and which page of the document the e-mail holds. In particular, as this example shows, in a case where management numbers and page numbers are given to the subject of the header section of email, it is possible to understand the identification and pages of the document by only looking at the subject at a mailer, etc., at the receiving side.

Furthermore, as shown in FIG.9, when the subject is overwritten on image data, it is possible to easily understand the identification and pages of the document where the receiving side is an IFAX and the received image data is printed out. Thus, according to the first preferred embodiment, document management becomes easy.

With an e-mail converting apparatus 1 according to the first embodiment of the invention, although facsimile data are divided page by page, a certain plurality of pages may be made into a divisional unit. At this time, the divisional unit may be set to the maximum number of pages which can be stored by the receiving memory area 32. Thus, according to the IFAX of the present Invention, image data can be converted to e-mail per the predetermined page number of the original which the operator requires wished. In other words, one of the divisional unit may be included plurality of page of the original.

In addition, according to the first embodiment described above, it is possible to achieve a transfer of image data using e-mail by providing the e-mail converting apparatus 1 between the existing facsimile apparatus and the telephone line L2.

Second Preferred Embodiment

Hereinafter, a description is given of the configuration of an Internet facsimile in which an e-mail converting apparatus similar to that of the above-mentioned first preferred embodiment is incorporated.

Figure 10:
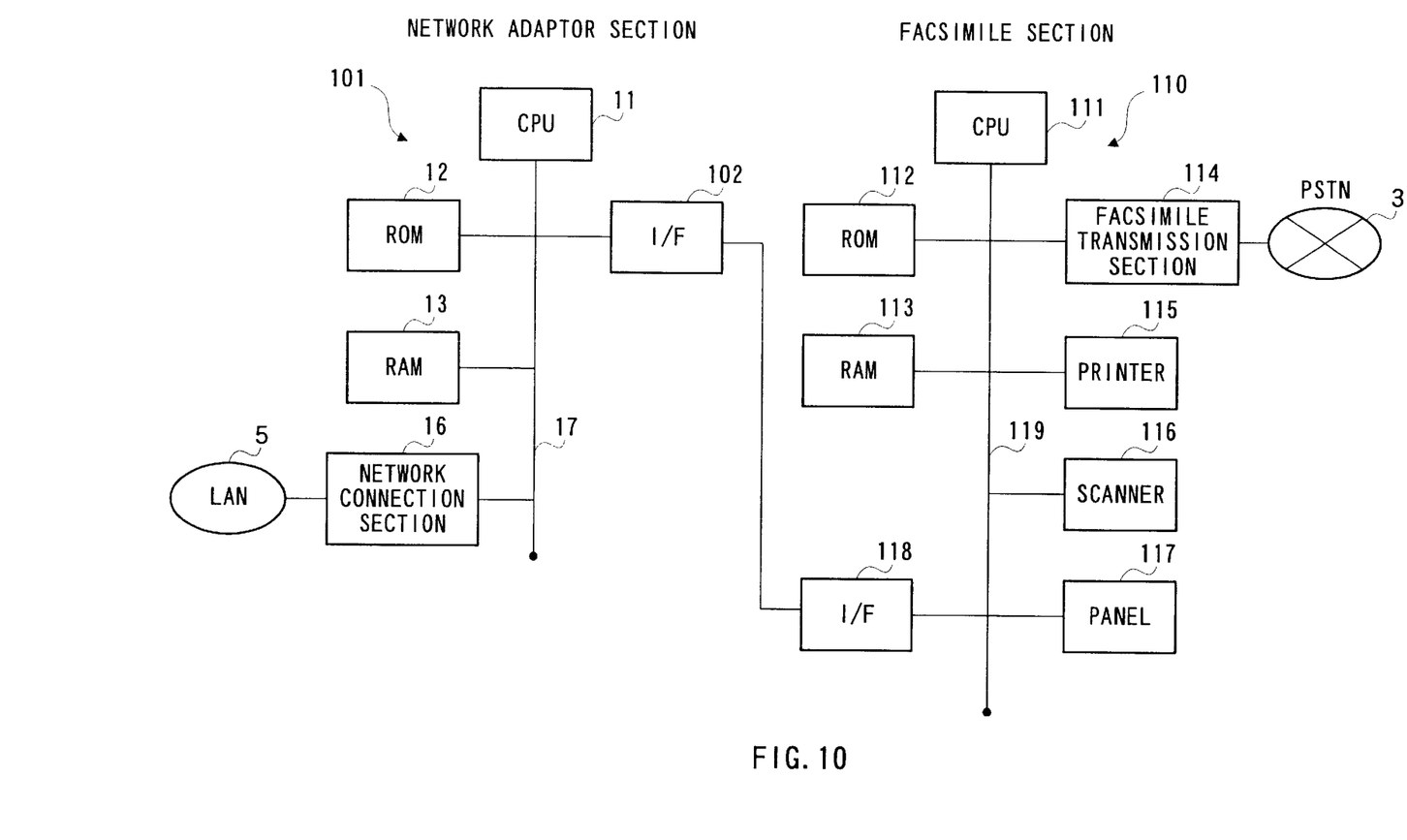
FIG.10 is a block diagram showing a hardware configuration of an Internet facsimile apparatus according to a second preferred embodiment of the invention.

FIG.10 is a block diagram showing a hardware configuration of an IFAX according to the second preferred embodiment of the invention. The parts which are the same as those in FIG.2 are given the same reference numbers, and the description thereof is omitted.

IFAX 100 is composed of a network adaptor section 101 operating as an e-mail converting section, and a facsimile section 110 which mainly carries out facsimile transmissions.

The network adaptor section 101 is equipped with a CPU 11, a ROM 12, a RAM 13, a network connection section 16 and a bus 17 as in the e-mail converting apparatus 1 of FIG.2. Interface section 102 is an interface to receive and transmit data between the network adaptor section 101 and the facsimile section 110. The interface section 102 is, for example, an RS232C interface.

On the other hand, in the facsimile section 110, the CPU 111 executes various types of programs and controls the respective portions of the facsimile section 110. The ROM 112 stores programs which are executed by the CPU 111. The RAM 113 is used as a work area of the programs and, at the same time, is used as a receiving memory area in which the received facsimile data are stored.

The facsimile communication section 114 receives and transmits data via a PSTN 3 according to the facsimile protocol. The facsimile transmission section 114 is provided with a modem which is in charge of the modulation and demodulation process. Furthermore, the facsimile transmission section 114 is in charge of the process of compressing and expanding image data.

A printer 115 prints out data. A scanner 116 scans and reads an original document. Using an operation panel 117, a user performs a variety of operations of the IFAX 100, and at the same time, the operation panel 117 informs the user of various kinds of information. The operation panel 117 is provided with operational keys such as ten numeral keys and functional keys, and a display section such as an LCD.

Interface section 118 is an interface which receives and transmits data between the interface section 102 at the network adaptor section 101 side and the facsimile section 110.

A bus 119 is a channel through which data are transferred among the CPU111, ROM112, RAM113, facsimile transmission section 114, printer 115, scanner 116, operation panel 117 and interface section 118.

With the IFAX 100 constructed as described above, in the facsimile section 110, the scanner section 116 scans an original document to obtain image data. Then, the facsimile section 114 compresses the image data to obtain facsimile data. The facsimile data are received by the network adapter section 101 via the interface sections 102 and 118. In the network adaptor section 101, the facsimile data are converted to e-mail page by page as in the first preferred embodiment, and are transmitted with the management numbers and page numbers attached thereto. Thereby, by the IFAX 100 according to the second preferred embodiment, it is possible to achieve reducing of the receiving memory capacity and easy document management in addition to improvements in the transmission quality as in the first preferred embodiment.

In addition, according to the second embodiment described above, it is possible to achieve a transfer of image data using e-mail by providing the network adapter 101 in the existing facsimile apparatus 2. In this case that is different from the first embodiment, image data scanned by the scanner 116 provided in the facsimile section 110 is directly transferred to the network adapter section 101 to be converted to an e-mail. Therefore it is possible to transmit image data easier and faster in this case than the case where image data are communicated with an external facsimile apparatus according to the G3 FAX procedure.

Third Preferred Embodiment

Figure 11:
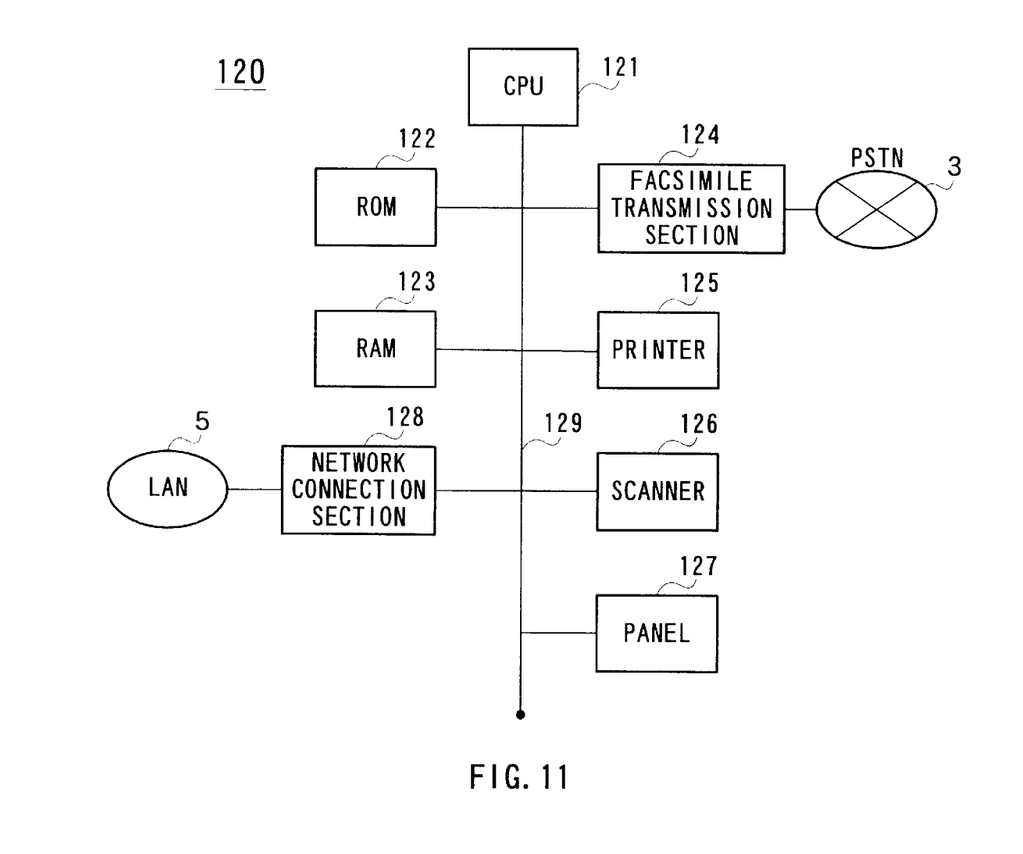
FIG.11 is a block diagram showing a hardware configuration of the Internet facsimile apparatus according to the above-mentioned third preferred embodiment of the invention.

Hereinafter, a description is given of an IFAX which is able to recognize paper size. FIG.11 is a block diagram showing a hardware configuration of an IFAX according to the third preferred embodiment of the invention.

The central processing unit (CPU) 121 executes a variety of programs and controls the respective parts of the IFAX 120. A ROM 122 stores programs executed by the CPU 121. A RAM 123 is used as a work area of the programs, and, at the same time, is used as an image memory for storing the facsimile data.

A facsimile transmission section 124 carries out transmission with the peripheral facsimiles via the PSTN 3 in compliance with the facsimile transmission protocol. The facsimile transmission section 124 is provided with a modem which carries out the modulation and demodulation, an image compressing section, and an image expanding section which, respectively, compresses and expands the image data.

A printer 125 prints out data. A scanner 126 scans and reads a document. At an operation panel 127, a user performs various kinds of operation of the IFAX 120, and the operation panel 127 informs the user of various types of information. The operation panel 127 is provided with operation keys such as ten numeral keys and function keys, etc., and a display section such as an LCD. The operation panel 127 is also an input section for inputting destination addresses. For example, when the user presses down a shortened key, the registered destination address is inputted into the CPU 121.

A network connection section 128 is an interface which controls transmission and receiving of data with respect to the LAN 5. A bus 129 is a channel through which data are transferred among the CPU 121, ROM 122, RAM 123, facsimile transmission section 124, printer 125, scanner 126, operation panel 127, and network transmission section 128.

Figure 12:
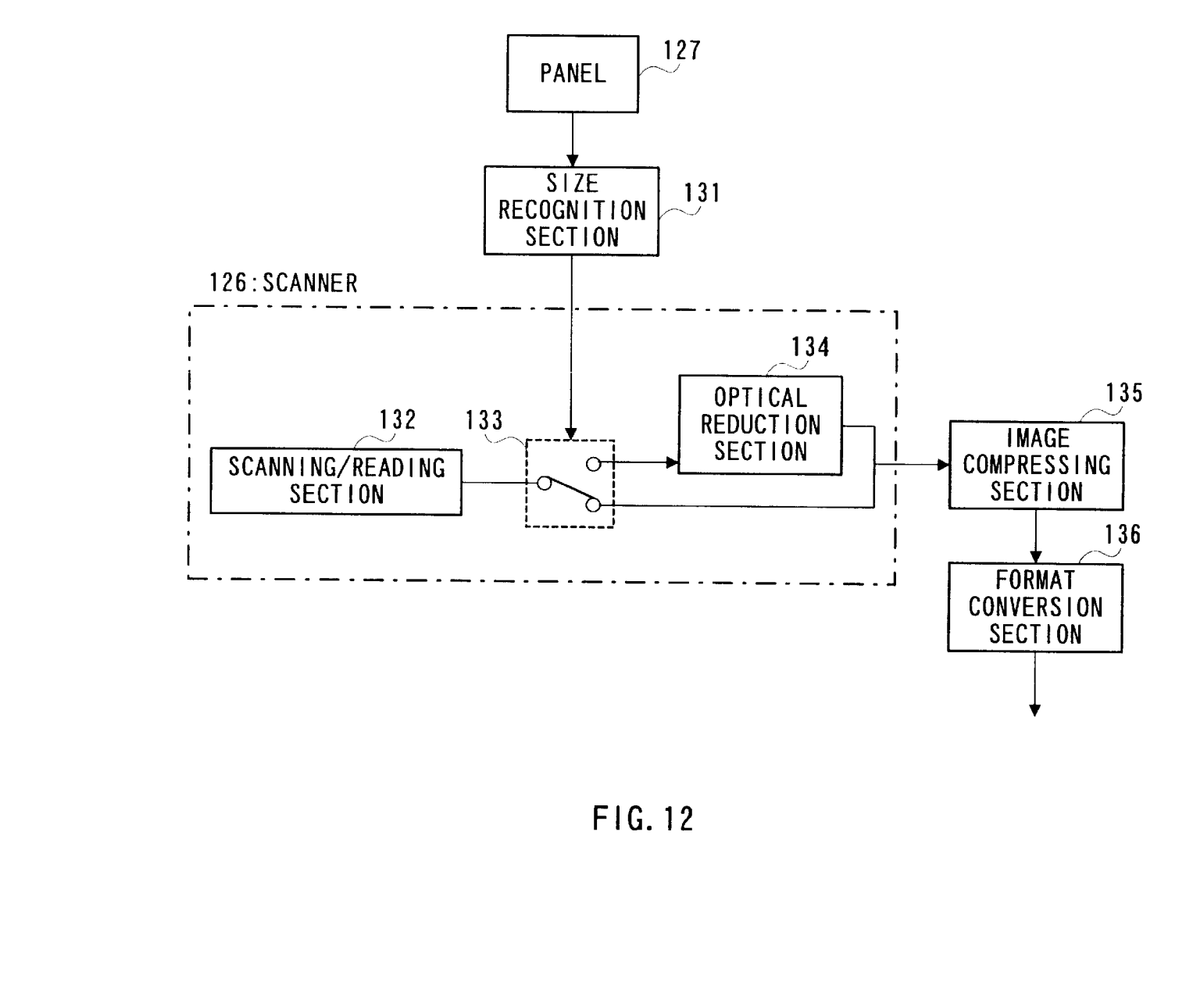
FIG.12 is a function block diagram of the Internet facsimile apparatus according to the above-mentioned third preferred embodiment.

FIG. 12 is a function block diagram of an IFAX 120 according to the above-mentioned third preferred embodiment.

A size recognition section 131 recognizes a paper size to be transmitted, on the basis of the destination address inputted by the operation panel 127. In detail, acountry, region, etc., where a destination facsimile is installed is recognized on the basis of the domain name of the destination address, wherein a paper size available in a general facsimile apparatus in the destination country, etc., is recognized. For example, in a case where the destination address is a domain name assigned to Japan, such as ".co.jp", ".or.jp", ".ne.jp", etc., it is recognized that the facsimile apparatus of the destination is in Japan. Facsimile apparatuses sold in Japan have a greater memory capacity, and are able to handle comparatively large sizes such as, for example B4 size. Therefore, it is recognized that the allowable paper size is "large".

On the other hand, if the destination address is a domain name assigned to a European and North American country, such as ".com", ".uk", ".de", or the like, it is recognized that the facsimile apparatus of the destination is in any one of the European or North American countries. Facsimile apparatuses sold in these countries have smaller memory capacity, and are able to handle only letter size paper. Therefore, it is assumed that the allowable paper size is "small".

In a case where the size recognition section 131 recognizes that the paper size is "small", an instruction in given to the scanner 126, wherein an optical reduction process is carried out, as described below.

A reading section 132 reads a document and converts the data to bit map data. A switching section 133 carries out a switching, to determine whether or not the optical reduction section 134 is performed, on the basis of the instruction of the size recognition section 131.

An image compressing section 135 compresses bit map data to facsimile data like MR. A format converting section 136 converts the facsimile data to e-mail as described in the above-mentioned first preferred embodiment.

Figure 13:
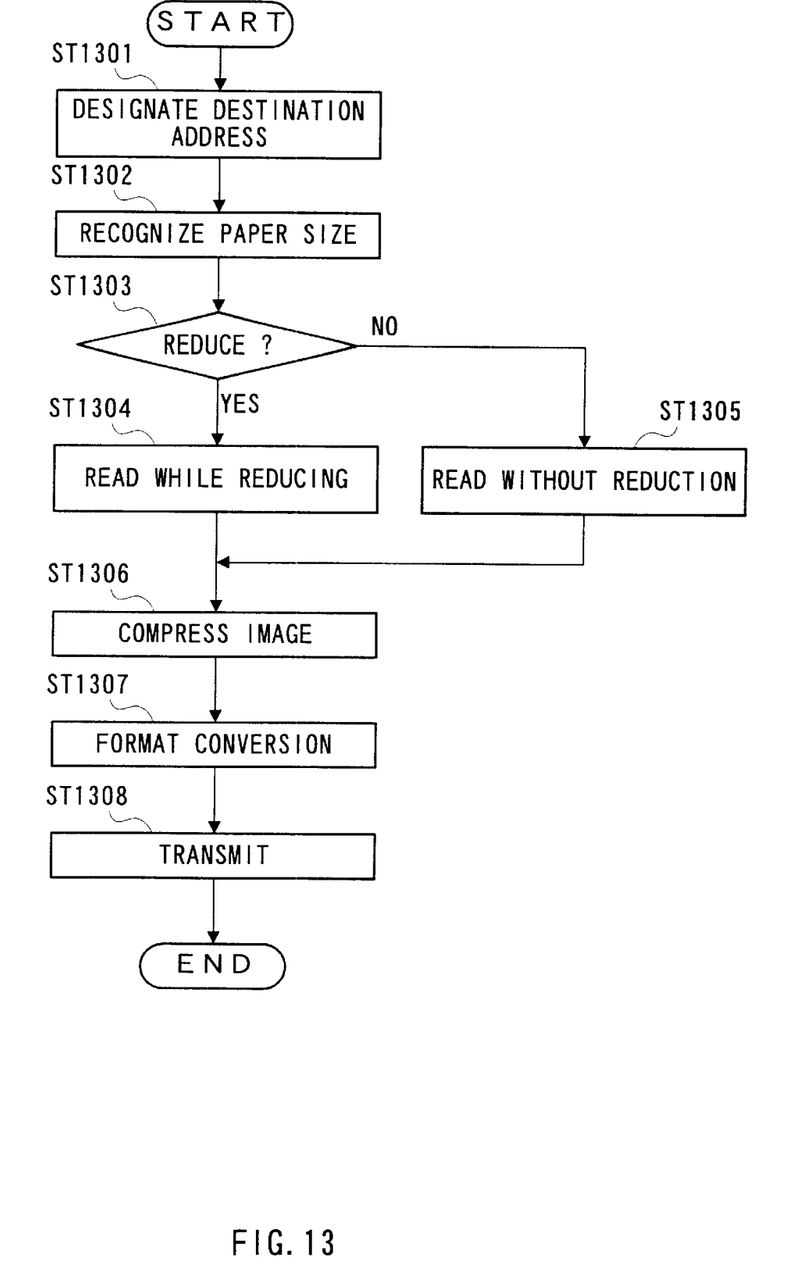
FIG.13 is a flow diagram showing actions of the Internet facsimile apparatus according to the above-mentioned third preferred embodiment.

FIG. 13 is a flow chart the showing actions of the IFAX 120 according to the above-mentioned third preferred embodiment.

In ST 1301, a destination address is designated by the operation panel 127.

In ST 1302, the size recognition section 131 recognizes a paper size on the basis of the destination address. In ST 1303, the size recognition section 131 decides, on the basis of a result of the decision of paper size, whether or not an optical reduction process is carried out. In detail, in a case where the domain name of the destination address is other than ".jp", an optical reduction process is to be performed.

In the case of performing an optical reduction process, in ST 1304, the scanner 126 scans and reads a document while optically reducing the same. On the other hand, in a case where no reduction is carried out, in ST 1305, the scanner scans and reads the document without any reduction.

In ST 1306, the image compressing section 135 compresses the read image to facsimile data. In ST 1307, the format converting section 137 converts facsimile data to an e-mail format. In ST 1308, the mail transmission section transmits an e-mail to the destination address.

The facsimile data are divided page by page and format-converted as in the above-mentioned first preferred embodiment. Furthermore, e-mail are managed by management numbers and page numbers.

With the IFAX 120 according to the above-mentioned third preferred embodiment, which is constructed as described above, the capacity of the receiving side is assumed on the basis of the destination address, and data responsive to the assumed capacity are transmitted. Thereby, it is possible to handle international transmissions.

As explained above, according to the invention, in transmission and receiving of facsimile data via the Internet, it is possible to prevent receiving errors from occurring and to improve transmission quality. Furthermore, it is possible to handle international transmissions.

The present invention is applicable to a server that receives image data from a client to distribute to another client. In addition, the present invention includes a computer-readable storage medium for storing a program to execute the same processing as the internet facsimile apparatus according to the first to the third embodiments. Further, the present invention is applicable to a personal computer for executing the program stored in the computer-readable storage medium with a scanner connected and a network communication section comprised.

The present invention is not limited to the above described embodiments, and various variations and modifications may be possible without departing from the scope of the present invention.

This application is based on the Japanese Patent Application No. HEI 10-195667 filed on Jul. 10, 1998, entire content of which is expressly incorporated by reference herein.

What is claimed is:

1. An apparatus for converting image data to e-mail data, comprising:
   a format converter that converts image data to e-mail data per each divisional unit; and
   an e-mail transmitter that transmits the e-mail data via a network,
   wherein the divisional unit is equivalent to n pages of a document of the image data, wherein n is an integer equal to or greater than 1.

2. The apparatus according to claim 1, further comprising a paper size recognition section that recognizes a paper size acceptable by a reception terminal on the basis of a destination address of the e-mail data, and a size converter that converts image data to conform to the recognized paper size.

3. The apparatus according to claim 1, further comprising a divisional unit management section that generates management information for each of the image data.

4. The apparatus according to claim 3, wherein said divisional unit management section generates unit information for each of the divisional units.

5. An apparatus for converting image data to e-mail data, comprising:

a memory that stores image data;

a format converter that converts the image data to e-mail data per each divisional unit; and an e-mail transmitter that transmits the e-mail data via a network;

wherein the divisional unit is equivalent to image data corresponding to the maximum pages storable in said memory.

6. An internet facsimile apparatus, comprising:

a scanner that scans an original to obtain image data;

a facsimile transmitter that performs a communication in compliance with a facsimile protocol;

a format converter that converts image data to e-mail data per each divisional unit; and an e-mail transmitter that transmits the e-mail data via a network, wherein the divisional unit is equivalent to n pages of a document of the image data, wherein n is an integer equal to or greater than 1.

7. The apparatus according to claim 6, further comprising a paper size recognition section that recognizes a paper size acceptable by a reception terminal on the basis of a destination address of the e-mail data, and a size converter that converts image data to conform to the recognized paper size.

8. An internet facsimile apparatus, comprising:

a scanner that scans an original to obtain image data;

a facsimile transmitter that performs a communication in compliance with a facsimile protocol;

a memory that stores the image data;

a format converter that converts the image data to e-mail data per each divisional unit; and an e-mail transmitter that transmits the e-mail data via a network;

wherein the divisional unit is equivalent to image data corresponding to the maximum pages storable in said memory.

9. A server for converting received image data to transmit to a destination terminal, comprising:

a reception section that receives the image data;

a format converter that converts the image data to e-mail data per each divisional unit; and an e-mail transmitter that transmits the e-mail data to the destination terminal via a network.

10. The server according to claim 9, wherein the divisional unit is equivalent to n pages of a document of the image data, wherein n is an integer equal to or greater than 1.

11. A method for converting image data to e-mail data, comprising:

converting image data to e-mail data per each divisional unit; and transmitting the e-mail data via a network, wherein the divisional unit is equivalent to n pages of a document of the image data, wherein n is an integer equal to or greater than 1.

12. The method according to claim 11, further comprising recognizing a paper size acceptable by a reception terminal on the basis of a destination address of the e-mail data, and converting image data to conform to the recognized paper size.

13. The method according to claim 11, further comprising generating management information for each of the image data.

14. The method according to claim 13, further comprising generating unit information for each of the divisional units.

15. A method for converting image data to e-mail data, comprising:

storing the image data in a memory;

converting the image data to e-mail data per each divisional unit; and transmitting the e-mail data via a network;

wherein the divisional unit is equivalent to image data corresponding to the maximum pages storable in the memory.

* * * * *